United States Patent [19]
Duvall

[11] 3,994,706
[45] Nov. 30, 1976

[54] REMOVAL AND RECOVERY OF SULFUR DIOXIDE FROM STACK GASES

[76] Inventor: Lee J. Duvall, 1855 Trevilian Way, Louisville, Ky. 40205

[22] Filed: Feb. 12, 1975

[21] Appl. No.: 549,150

[52] U.S. Cl. .................................. 62/11; 62/37; 423/212; 423/242; 423/511; 423/542
[51] Int. Cl.² .......................................... F25J 3/00
[58] Field of Search ................. 62/9, 10, 11, 12, 21, 62/36, 37, 18; 423/210, 212, 242, 511, 539, 542; 110/31

[56] References Cited
UNITED STATES PATENTS

| | | | |
|---|---|---|---|
| 1,810,312 | 6/1931 | Hasche | 62/18 |
| 1,939,693 | 12/1933 | Hasche | 62/18 |
| 1,939,694 | 12/1933 | Hasche | 62/18 |
| 1,939,695 | 12/1933 | Hasche | 62/18 |
| 2,003,922 | 6/1935 | Claret | 62/10 |
| 2,011,551 | 8/1935 | Hasche | 62/10 |
| 2,143,283 | 1/1939 | Schmidt | 62/10 |
| 2,162,637 | 6/1939 | Pitt et al. | 423/542 |

*Primary Examiner*—Frank W. Lutter
*Assistant Examiner*—Frank Sever
*Attorney, Agent, or Firm*—Bacon & Thomas

[57] ABSTRACT

A method and apparatus for the removal and recovery of sulfur dioxide from gaseous effluent is disclosed. Sulfur dioxide entrained in stack gases, emanated upon combustion of sulfur-bearing materials, is selectively liquefied under the combined influence of a reduction in temperature and an increase in pressure of the gaseous effluent.

10 Claims, 1 Drawing Figure

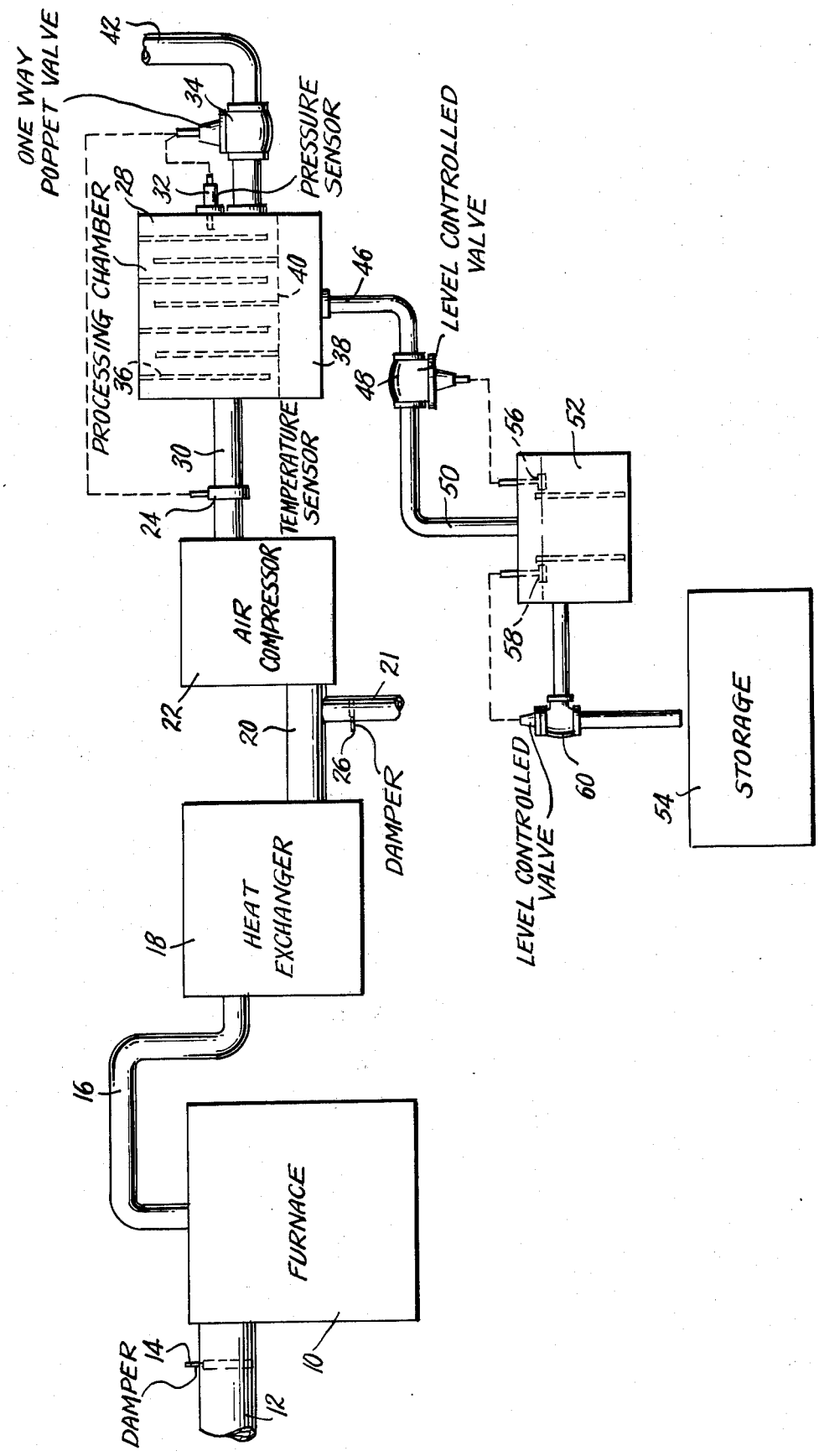

REMOVAL AND RECOVERY OF SULFUR DIOXIDE FROM STACK GASES

BACKGROUND OF THE INVENTION

1. Field of the Invention:

The present invention relates to a simple, yet efficient method and apparatus for the extraction of sulfur dioxide from gaseous effluent emitted upon combustion of sulfur-bearing materials.

Recent widespread attention has been directed toward the environmental impact attendant the combustion of sulfur-bearing fuels as the source of essentially sulfur-free fuels becomes exceedingly scarce. As these sulfur-bearing fuels are combusted in, for example, the production of electrical power, copious quantities of sulfur dioxide are generated which must be removed from the gaseous effluent before it is discharged to the atmosphere. The present invention is directed to both achieving these ends and, additionally, providing for the easy recovery of sulfur dioxide in commercially useable form.

2. Description of the Prior Art:

Many techniques have been developed to remove noxious sulfur dioxide from stack gases emitted upon combustion of sulfurous fuels. Chemical scrubbers and catalytic, fluidized beds often have been advanced for these purposes; however, most often these are complex apparatus of high cost which, while removing the sulfur dioxide component, generally do not yield an easily recoverable end product, should such be desirable.

Similarly, other systems employ extractive techniques for the removal of sulfur dioxide from gaseous effluent which yield sulfur dioxide trapped in a catalytic or absorbent agent. Thus, not only is recovery of the sulfur dioxide made more difficult but, additionally, the catalyst or sorbent must then be regenerated after a relatively short amount of time to render same continuously useful.

Other systems rest upon the ease of liquefaction of sulfur dioxide from its gaseous state for their efficacy. See, for example, Hasche U.S. Pat. No. 1,810,312 and 1,939,694. However, such systems too present considerable drawbacks. For instance, and quite importantly, furnace efficiency may be reduced as the result of surging through the system.

Accordingly, the need exists to efficiently, yet simply, extract sulfur dioxide from gaseous effluent emitted from the combustion of sulfur-bearing materials and allow recovery of the sulfur dioxide component in a commercially useable form.

SUMMARY OF THE INVENTION

Accordingly, it is a primary object of this invention to efficiently separate sulfur dioxide from gaseous effluent emitted upon the combustion of sulfur-bearing fuels.

It is another object of this invention to recover the sulfur dioxide in a commercially useable form.

It is yet another object of this invention to provide a simple, yet efficient system which may be adapted to a wide range of furnace parameters without impairing the efficiency thereof.

Other objects and advantages of the present invention will be apparent from the following description of the specific embodiment thereof when taken in conjunction with the drawings and appended claims.

In accordance with the present invention, it has been determined that the foregoing objects and advantages may be realized by air reduction of the gaseous effluent emitted upon combustion of sulfur-bearing materials to liquefy the sulfur dioxide component thereof. In carrying out the invention, the stack gases are first cooled and subsequently compressed to a degree sufficient to afford liquefaction of sulfur dioxide, followed by recovery thereof through suitable pressure-isolation means to allow constant, uninterrupted operation of the system. The liquid thus recovered is capable of many commercial uses such as, for example, leaching textile fibers, etc., without further, extensive processing.

BRIEF DESCRIPTION OF THE DRAWING

FIG. 1 is a diagrammatic sketch of the apparatus of the present invention.

DETAILED DESCRIPTION OF THE INVENTION

In order to further illustrate the present invention and the advantages thereof, the following preferred embodiment will be described, the same intended to be illustrative and in no wise limitative.

The present invention rests upon the ease of liquefaction of sulfur dioxide at ambient temperatures and relatively low pressures. Sulfur-bearing fuels combusted in a furnace employed, for example, in the generation of electric power, emit copious quantities of sulfur dioxide entrained in the gaseous effluent. This effluent is first cooled to substantially the ambient temperature of the location of the plant and subsequently compressed to a degree sufficient to effect liquefaction of the sulfur dioxide component of the effluent. The exact operating parameters are not critical, provided, however, the temperature of the gaseous effluent is reduced to at least 158° C., the critical temperature of sulfur dioxide. The temperature is automatically detected and the proper degree of compression is automatically adjusted predicated thereon. Having been cooled and compressed to a degree sufficient to afford liquefaction of the sulfur dioxide component, the effluent is passed through a process area wherein sulfur dioxide liquid is collected. The effluent, now essentially free from sulfur dioxide contamination, is discharged to the atmosphere in such a fashion that the overall system pressure and flow rates remain essentially constant thus precluding surging through the furnace which would, of course, result in uneven and inefficient operation thereof.

The liquid sulfur dioxide is removed from the collection chamber via a pressure-isolation chamber such that system pressures are similarly held essentially constant. The liquid sulfur dioxide is then stored for other commercial uses.

Referring to FIG. 1, there is shown diagrammatically a system according to the present invention for use in the abatement of air pollution resulting from the release of sulfur dioxide to the atmosphere as the result of combustion of sulfur-bearing fuels. These fuels, typically coal or oil, are combusted in a furnace 10 to, for example, provide steam for the generation of electrical power. The furnace, as is conventional, is equipped with an inlet duct 12 which, additionally, incorporates a damper 14 to be more fully described hereinbelow. Gaseous effluent resulting from the combustion of the fuel and containing considerable quantities of sulfur dioxide is removed from furnace 10 via an exit duct 16 and is thence directed to a heat exchanger 18. Typically, the gaseous effluent emitted from furnace 10 will arrive at heat exchanger 18 at a temperature of approximately 150° C. However, depending upon the efficiency of the furnace or other operating parameters, the temperature of the effluent may range between 100° and 200° C.

Recognizing that sulfur dioxide possesses a critical temperature of approximately 158° C., it is necessary that the effluent be cooled to at least that temperature and, preferably, to within the range of approximately 55° to 65° C. Most preferably, this effluent will be cooled to within the range of approximately 1° to 5° C. The necessary cooling is achieved by heat exchanger 18 which may be of any variety well known to the skilled artisan; for example, countercurrent liquid or air. Most preferably, heat exchanger 18 is an air-type heat exchanger where cooling is effected by drawing ambient air over a plurality of coils through which the gaseous effluent flows. These cooled gases are then directed to an air compressor 22 via exit duct 20. The exit duct 20 is provided with an auxiliary duct 21 containing a damper 26, to be more fully described hereinbelow.

In order to effect separation of the sulfur dioxide component from the gaseous effluent, it is necessary to compress the gases to a degree corresponding to the pressure-temperature thermodynamic relationship of the vapor/liquid equilibrium of sulfur dioxide. This degree of compression is automatically determined by first sensing the temperature of the gaseous effluent emitted from compressor 22 by temperature sensor 24, which may be of any convenient design and provide electrical, mechanical or hydraulic output to poppet valve 34, which is then automatically controlled to provide the desired degree of compression in process chamber 28. For example, for gaseous effluent which has been cooled to approximately 25° C., there will be required a degree of compression resulting in an absolute pressure of approximately 4 kgm/cm² (58 p.s.i.) to initiate liquefaction of the sulfur dioxide component. Due to such considerations as the rise in temperature of the gaseous effluent accompanying compression in air compressor 22 (i.e., heat of compression), it is desirable to provide a pressure of at least, approximately, 5 to 6 kgm/cm² absolute. Also, chemical interaction between the effluent components will necessitate a somewhat higher degree of compression than theoretical. The compressed vapors are passed to a process chamber 28 via an exit duct 30 and through a temperature sensor 24 which is provided to control a one-way poppet valve 34.

The compressed effluent entering process chamber 28 is caused to follow a sinuous route about baffle member 36 upon which the sulfur dioxide component liquefies due to the reduction in temperature provided by heat exchanger 18 and increase in pressure provided by air compressor 22. The processing chamber 28 is divided to provide a lower, collection chamber 38 by a perforated panel 40. Thus, the liquid sulfur dioxide removed from gaseous effluent will drain downwardly on baffle members 36 through perforated panel 40 and collect in chamber 38.

The residium effluent, essentially free from sulfur dioxide component, is removed from process chamber 38 through one-way poppet valve 34 and stack 42 and is discharged therefrom to the atmosphere.

Dampers 14 and 26 heretofore mentioned, in concert with one-way poppet valve 34 and cooperating temperature sensor 24, are provided to afford a constant air flow through furnace 10 thus foreclosing the surging of air therethrough which would otherwise result in uneven and inefficient furnace operation. The one-way poppet valve 34 is automatically adjusted for system pressure by means of temperature sensor 24 which emits a suitable signal activating the poppet valve. Depending upon design criteria, the signal from temperature sensor 24 may be electrical, mechanical or hydraulic. As demand changes are made upon the furnace, the pressure-temperature relationship, as well as the volume flow of gaseous effluent, will similarly be affected. As these changes occur, temperature sensor 24 provides control for one-way poppet valve 34 thereby allowing appropriate change in the volume flow rate of effluent from the system which bears directly upon the pressure therein. More particularly, temperature sensor 24 translates the temperature of the compressed effluent into a signal suitable for adjusting [i.e., opening or closing] poppet valve 34, while pressure sensor 32 provides a signal to valve 34 indicating that the required pressure in process chamber 28 has been attained.

Similarly, dampers 14 and 26 are adjustable to allow a wide range of flow rates through the system and may selectively be adjusted to provide constant operating conditions for furnace 10. Specifically, damper 14 is selectively adjustable to afford a constant flow rate through furnace 10 at the rate most efficient therefor, and this rate is independently adjustable over the entire range of operating parameters of the furnace without regard to those of the appended removal system. As operating parameters of the removal system vary in response to the pressure/temperature demands therein, air is selectively admitted to the system via damper 26 to afford the most efficient removal of liquid sulfur dioxide.

If, for example, furnace 10 requires 10,000 CFM of air for most efficient operation, the total volume of air will be admitted through damper 14. Due to the quality of fuel employed, the volume of stack gas may vary slightly, but this will have little, if any, effect upon these initial requirements. The intake of compressor 22 draws air through damper 14 and damper 26 is correspondingly adjusted, preferably automatically, to insure this constant 10,000 CFM of air through furnace 10. If the required pressure in process chamber 28 varies in response to, for example, a change in the ambient temperature, damper 26 is automatically opened or closed to insure proper operating conditions while yet allowing constant flow through furnace 10. Accordingly, the system is capable of effective and efficient removal of sulfur dioxide from the gaseous effluent over an adjustably controllable range of from about 100 CFM to about 100,000 CFM.

The liquid sulfur dioxide collected in chamber 38 is removed via exit duct 46, through level controlled valve 48 and duct 50 to isolation chamber 52 which allows removal of the liquid sulfur dioxide to a storage facility 54 without effecting the system pressure in process chamber 28.

As the level of liquid sulfur dioxide falls below a predetermined point, a float 56 causes level control valve 48 to open admitting liquid sulfur dioxide from collection chamber 38 to chamber 52. Simultaneously with the opening of valve 48, a float 58 causes level control valve 60 to be shut. As the liquid level rises, these floats 56, 58 cause corresponding valves 48, 60 to close and open, respectively, thus allowing the liquid in isolation chamber 52 to be transferred to storage. Accordingly, the fluid is removed from the system under substantially isobaric conditions.

While the invention has been described and illustrated with reference to a certain preferred embodiment thereof, those skilled in the art will appreciate that various modifications, changes, omissions and substitutions can be made without departing from the spirit of the invention. It is intended, therefore, that the invention be limited only by the scope of the following claims.

What is claimed is:

1. The method for removal and recovery of sulfur dioxide entrained in a gaseous effluent emitted upon combustion of sulfur-containing materials in a furnace having a predetermined volume flow rate of air therethrough for efficient operation, said method comprising the steps of:
    a. cooling said effluent;
    b. compressing said effluent;
    c. sensing the pressure of said effluent;
    d. sensing the temperature of said effluent;
    e. selectively admitting a volume of air through damper flow means to said effluent in response to the pressure/temperature conditions thereof, to maintain essentially constant said predetermined volume flow rate of air through said furnace whereby surging of air therethrough is essentially precluded;
    f. liquefying said sulfur dioxide to yield a residuum effluent essentially free therefrom; and,
    g. controlledly discharging said residuum to the atmosphere in response to the pressure and temperature conditions thereof.

2. The method of claim 1, wherein the step of sensing the temperature of said cooled effluent comprises generating a signal in response thereto and wherein said compressing step is automatically controlled by said signal.

3. The method of claim 1, wherein said discharging step includes automatically detecting the pressure of said compressed effluent, generating a signal in response thereto and automatically discharging said residuum at a volume flow rate proportional to said signal.

4. The method of claim 1 further including the step of collecting said liquefied sulfur dioxide.

5. The method of claim 4, further including recovery of said sulfur dioxide under substantially isobaric conditions.

6. The method of claim 1, wherein said effluent is cooled to a temperature within the range of about 65° C. to about 1° C. and is compressed to a pressure within the range of about 150 p.s.i.g. to about 10 p.s.i.g.

7. An apparatus for removal and recovery of sulfur dioxide entrained in a gaseous effluent emitted upon combustion of sulfur-bearing materials in a furnace having a predetermined volume flow rate of air therethrough for efficient operation, said apparatus comprising:
    a. means for cooling said effluent communicating with,
    b. means for compressing said effluent;
    c. means for sensing the temperature of said effluent downstream of said means for compressing;
    d. damper flow means for selectively admitting a volume of air to said effluent upstream of said means of compressing in response to the pressure/temperature conditions thereof, to maintain essentially constant said predetermined volume flow rate of air through said furnace whereby surging of air therethrough is essentially precluded;
    e. means for liquefying said sulfur dioxide to yield a residuum effluent essentially free therefrom; and,
    f. means for sensing the pressure of the effluent contained within said means for liquefying;
    g. means downstream of said means for liquefying, for controlledly discharging said residuum to the atmosphere in response to the pressure and temperature conditions thereof.

8. The apparatus of claim 7, wherein said sensing means includes means for automatically detecting the temperature of said cooled effluent and generating a signal in proportion thereto and wherein said compressing means is automatically responsive to said signal.

9. The apparatus of claim 7 wherein said discharging means include a pressure detector for providing a signal proportional to the pressure of said compressed gaseous effluent and wherein said discharge means is automatically responsive to said signal.

10. The apparatus of claim 7 further including means associated with said liquefying means for recovery of said sulfur dioxide liquid under substantially isobaric conditions.

* * * * *